United States Patent
Deeming et al.

(10) Patent No.: US 11,627,178 B2
(45) Date of Patent: *Apr. 11, 2023

(54) PROVIDING GEOCODED TARGETED WEB CONTENT

(71) Applicant: VERIZON PATENT AND LICENSING INC., Basking Ridge, NJ (US)

(72) Inventors: Robert F. Deeming, New York, NY (US); Steven B. Johnson, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/380,199

(22) Filed: Jul. 20, 2021

(65) Prior Publication Data

US 2022/0014585 A1    Jan. 13, 2022

Related U.S. Application Data

(63) Continuation of application No. 16/213,798, filed on Dec. 7, 2018, now Pat. No. 11,102,274, which is a
(Continued)

(51) Int. Cl.
*G06F 16/29* (2019.01)
*G06F 16/9537* (2019.01)
(Continued)

(52) U.S. Cl.
CPC .............. *H04L 67/10* (2013.01); *G06F 16/29* (2019.01); *G06F 16/9537* (2019.01); *G06Q 30/0251* (2013.01)

(58) Field of Classification Search
CPC ....... H04L 67/10; G06F 16/29; G06F 16/9537
See application file for complete search history.

(56) References Cited

U.S. PATENT DOCUMENTS 6,414,635 B1    6/2002 Stewart et al.
6,629,136 B1 *  9/2003 Naidoo .................. H04L 67/52
                                                719/329
(Continued)

FOREIGN PATENT DOCUMENTS

DE    112005002624 T5 *  9/2007  ............. G01C 21/20
EP          1783621         5/2007
WO    WO 2005/111787 A2   11/2005

OTHER PUBLICATIONS

Angel et al. Qualitative Geocoding of Persistent Web Pages. Proceedings of the 16th ACM SIGSPATIAL International Conference on Advances in Geographic Information Systems. Article No. 20, pp. 1-10 (2008). (Year: 2008).*

(Continued)

*Primary Examiner* — Virpi H Kanervo

(57) ABSTRACT

A system and method are disclosed for providing geocoded web content to a user based on a specific geographic location specified by the user. A determination module receives a geographic location from the user and determines latitude and longitude coordinates associated with the geographic location from a geographic information database. The determination module further determines a geographic boundary associated with the latitude and longitude coordinates based at least in part on an area of interest surrounding the geographic location. A web content search module determines web content comprising substance associated with a location within the geographic boundary. A front end interface transmits the determined web content for display in an order based at least in part on distance from the location associated with the web content to the geographic location.

20 Claims, 9 Drawing Sheets

Related U.S. Application Data continuation of application No. 13/911,653, filed on Jun. 6, 2013, now Pat. No. 10,187,453, which is a continuation of application No. 12/207,086, filed on Sep. 9, 2008, now Pat. No. 8,473,335.

(51) Int. Cl.
  *H04L 67/10* (2022.01)
  *G06Q 30/02* (2012.01)
  *G06Q 30/0251* (2023.01)

(56) References Cited

U.S. PATENT DOCUMENTS

| | | | |
|---|---|---|---|
| 6,906,643 | B2 | 6/2005 | Samadani et al. |
| 7,054,741 | B2 | 5/2006 | Harrison |
| 7,312,711 | B2 | 12/2007 | Fong et al. |
| 7,822,705 | B2 | 10/2010 | Xia |
| 8,249,804 | B2 | 8/2012 | Lokshin |
| 2001/0011270 | A1 | 8/2001 | Himmelstein et al. |
| 2002/0099606 | A1 | 7/2002 | Shlagman |
| 2006/0184640 | A1 | 8/2006 | Hatch |
| 2007/0136259 | A1* | 6/2007 | Dorfman ............ G06F 3/04812 |
| 2007/0185777 | A1 | 8/2007 | Pyle et al. |
| 2007/0288437 | A1 | 12/2007 | Xia |
| 2008/0098090 | A1 | 4/2008 | Geraci et al. |
| 2008/0288523 | A1 | 11/2008 | Blose |
| 2009/0070196 | A1 | 3/2009 | Shaffer et al. |
| 2010/0042940 | A1 | 2/2010 | Monday |
| 2010/0205016 | A1 | 8/2010 | Chen et al. |

OTHER PUBLICATIONS

Extended European Search Report in European Patent Application No. 09813425.7, dated Feb. 23, 2012 (9 pages).

Dolbear et al., "Geographical Linked Data: The Administrative Geography of Great Britain on the Semantic Web, Transactions in GIS," 12(Suppl. 1); 19-30 (2008) (12 pages).

McCurley, Kevin S., "Geospatial Mapping and Navigation on the Web," available at: www10.org/cdrom/papers/278/, May 2001 (16 pages).

Sanderson, Bruce N., Targeting Unstructured Data: GIS Aids Document Retrieval, GEO World, available at www.highbeam.com/doc/1G1-123120720.html, Sep. 2004 (5 pages).

PCT International Search Report and Written Opinion, PCT Application No. PCT/US09/54366, dated Oct. 7, 2009 (7 pages).

Makela et al., A Tool for Creating Semantic Web Portals, Onto Views, S.A. McIlrait et al. (EDS.).: ISWC 2004, LNCS 3298, pp. 797-811, (2004).

Gueye et al., Investigating the Imprecision of IP Block-Based Geolocation, S. Uhlig, K. Papagiannaki, and O. Bonaventure (eds.): PAM 2007, LNCS 4427, pp. 237-240, (2007).

Greaves, Marc, Semantic Web 2.0; The Sematic Web, IEEE Intelligent Systems, IEEE Computer Society, 2007 IEEE, pp. 94-96, (2007).

Boll et al., "Location and the Web", (LocWeb 2008). WWW 2008A/Workshop Summary. pp. 1261-1262. Apr. 21-25, 2008. Beijing, China. (Year: 2008).

* cited by examiner

Mountain View, CA

| Content | Address Tag (207) | Neighborhood Tag (209) | City Tag (211) |
|---|---|---|---|
| 201 — "Traffic In Mountain View" | 315 Castro Street, Mountain View, CA | Neighborhood: Downtown Mountain View | City: Mountain View |
| 203 — "A Look At Ducati Honda Peninsula" | 1289 W. El Camino Real, Mountain View, CA | Neighborhood: Old Mountain View | City: Mountain View |
| 205 — Cuesta Park Restaurant Guide | NA | Neighborhood: Cuesta Park | City: Mountain View |

PROVIDING GEOCODED TARGETED WEB CONTENT

CROSS-REFERENCE TO RELATED APPLICATIONS

This application is a continuation of and claims the benefit of priority to U.S. application Ser. No. 16/213,798, filed on Dec. 7, 2018, which is a continuation of and claims the benefit of priority to U.S. application Ser. No. 13/911,653, filed on Jun. 6, 2013, now U.S. Pat. No. 10,187,453, issued on Jan. 22, 2019, which is a continuation of and claims the benefit of priority to U.S. application Ser. No. 12/207,086, filed on Sep. 9, 2008, now U.S. Pat. No. 8,473,335, issued on Jun. 25, 2013, and is related to U.S. patent application Ser. No. 12/144,538, filed Jun. 23, 2008, and titled "Generating Geocoded Targeted Web Advertisements," the contents of which are hereby incorporated by reference in their entireties.

BACKGROUND

1. Field of Art

The disclosure generally relates to the field of providing relevant web content to users, and more particularly to geographic location-specific web content.

2. Description of the Related Art

To stay up to date with current events, much of the general public receives news and information from either a newspaper and/or through a televised news broadcast. These mechanisms allow a user to receive news information regarding various topics from sports, politics, weather, business or science. The information provided by the newspapers or news broadcasts allow the general public to be aware of what is happening in the world generally at a national or worldwide level.

Because more of the general public has begun to access the Internet, the number of available web sites on the Internet that provide news information has increased dramatically. Typically, newspapers and the television stations that host the news broadcasts also provide news information on the Internet. An advantage of hosting news information online is that a user is now capable of searching for specific news information of interest that is available on the website. However, conventional online news information websites only allow a user to search and locate information at a national or city level. A user is not capable of locating news information that pertains to the user at a specific geographic location such as an address or a neighborhood. Typically, current online news information websites merely locate news articles that contain the keywords of interest specified by the user. At best, conventional online news information websites are capable of receiving a zip code from a user and merely determine the city associated with the zip code and the news information relevant to the city. Thus, the conventional online news information websites are only capable of providing news information that is related to the users' specified geographic area at a high level, such as at city level, and are not capable of providing web content that is related to a specific geographic location such as an address.

Thus, there is lacking, inter alia, a method and system that provides users geographic location-specific web content that is targeted specifically to a geographic location specified by the user.

SUMMARY

One embodiment of a disclosed system and method is for providing users with web content that is relevant to a specific geographic location specified by a user. The system and method beneficially saves users time and effort when attempting to locate information that is relevant to a specific geographic location. The system and method associates the geographic location specified from the user as a centroid and provides the user with web content that is associated with an area surrounding the centroid. Generally, the area surrounding the centroid can be dynamically adjusted to focus on web content that contains substance or information that is relevant to an area that is within the vicinity (e.g., 1000 feet) of the centroid. Thus, the user is aware of news, events or stories, for example, which are occurring nearby the specified geographic location.

By providing web content that pertains to a specific geographic location that is within a 1000 ft of a user's home or current location, for example, the system and method provides web content that is much more relevant to the user compared to web content about the city in which the user is located. Generally, web content that is related to a very specific location, such as an address, is dynamic in relevance in that the relevance changes from one user to the next. For example, a news article regarding road construction is much more relevant to the user living on the street under construction compared to another user who lives one mile from the specific location and never drives on the street. The method and system provided described herein allows each individual user to locate information that may only be relevant to that particular user as the information pertains to a specific geographic location specified by the user.

In one embodiment, a web content hosting server receives a geographic location from a user. The web content hosting server determines latitude and longitude coordinates associated with the specified geographic location and determines a geographic boundary surrounding the latitude and longitude coordinates. The geographic boundary is determined by the web content hosting server based on a distance parameter that either narrows or broadens the geographic area associated with the web content in the search results that pertain to the latitude and longitude coordinates. The web content hosting server determines web content that is associated with an area within the geographic area defined by the distance parameter and provides the web content to the user. For example, the user may specify a geographic specific location, such as an address. The web content hosting server searches for the specified address location and may provide the user with news articles regarding stories related to an area within a specified distance from the address. A relevant news story may be, for example, about an Olympic swimmer who resides on the same street as the specified address.

Thus, the system and method beneficially provides geocoded targeted web content to a user so that the user no longer has to spend much effort to locate web content that is relevant to a specified location such as an address. An advantage of the system and method disclosed above is that the user the user is provided web content that is relevant to a specified street, address or neighborhood(s) allowing the user to keep track of what is occurring near their home or work, for example, without having to filter through web content that is irrelevant to the specified location.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a block diagram of the system architecture of the present invention.

FIG. 2 illustrates one embodiment of a web content table.

FIG. 5 illustrates one embodiment of a web page for receiving a geographic specific location.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system or method for purposes of illustration only. One skilled in the art will readily recognize from the following description that alternative embodiments of the structures and methods illustrated herein may be employed without departing from the principles described herein.

System Overview

Figure 1:
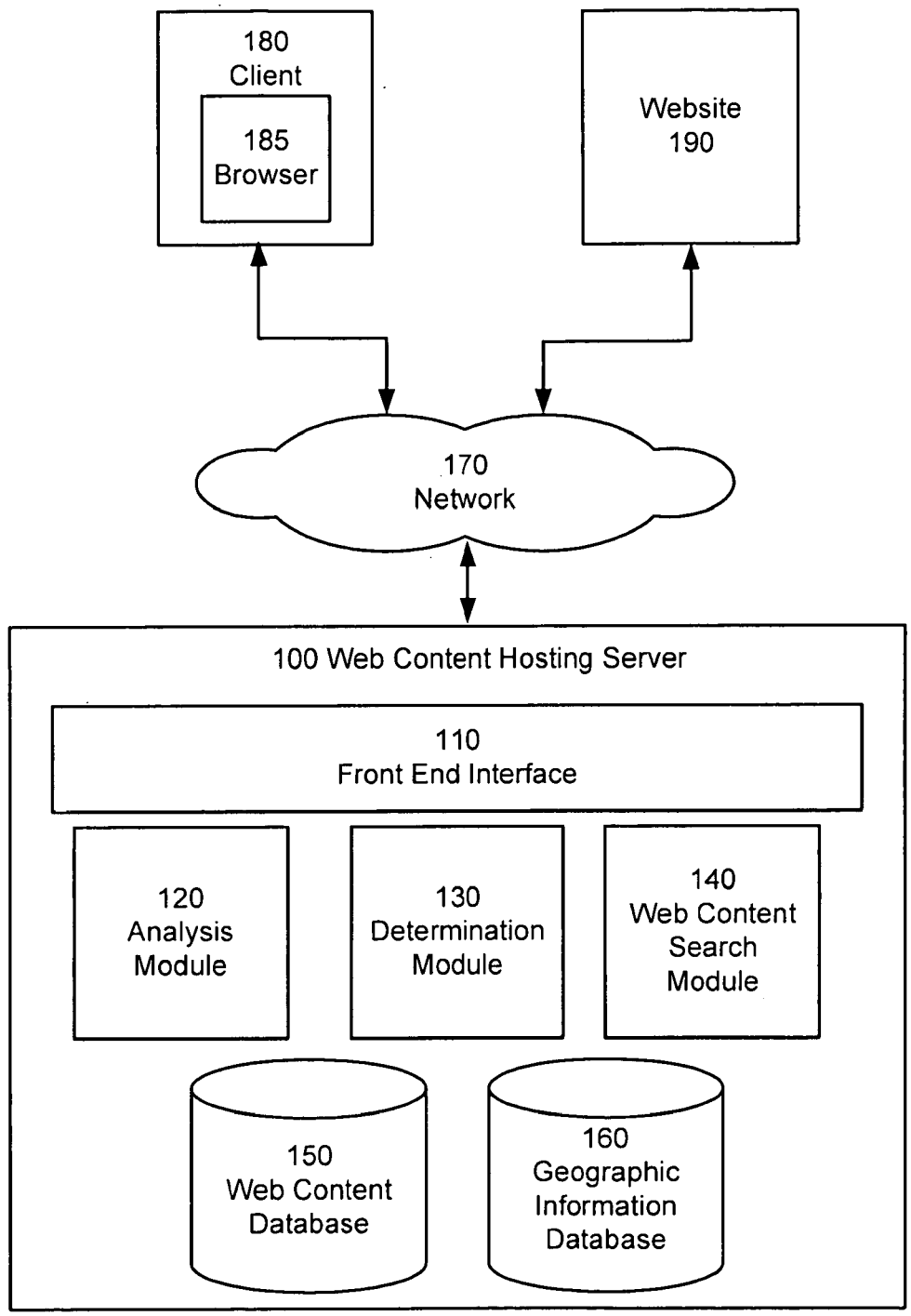

Referring now to FIG. 1, there is shown one embodiment of a system architecture including a web content hosting server 100. As shown in FIG. 1, a web content hosting server 100 comprises a front end interface 110, an analysis module 120, a determination module 130, a web content search module 140, a web content database 150 and a geographic information database 160.

In general, the web content hosting server 100 provides geocoded targeted web content to a user based at least in part on a geographic location specified by the user. By accessing the web content hosting server 100, a user is provided web content related to a specified location such as news articles related to the street that the user resides or events in a neighborhood of interest to the user. Geocoded targeted web content is web content that is relevant to a specific geographic location. Examples of geocoded targeted web content are news articles, sports information, music reviews, movie reviews, restaurant reviews, real estate information, gossip or any other web content that can be associated with a particular geographic location based on the substance comprised in the web content. An example of a geocoded targeted web content may be a local news article that comprises substance associated with the address location of 801 California Street in Mountain View, Calif. In one embodiment, the web content hosting server 100 associates the user's specified location as a centroid or centerpoint on a map and provides the user with geocoded targeted web content illustrating information that is occurring within a specified and/or defined area near the centroid.

Many conventional features, such as firewalls, load balancers, application servers, failover servers, site management tools and so forth are not shown so as not to obscure the features of the system illustrated in FIG. 1. An example web content hosting server 100 for implementation of the system is the web server hosting the website www.Outside.In. The examples disclosed herein may be applied to other web content hosting servers that are known as well. It will be understood that the term "web site" represents any computer system adapted to serve content using any inter-networking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Each of the various modules are implemented as part of a server program executing on server-class computer comprising a central processing unit (CPU), memory, network interface, peripheral interfaces, and other well known components. The computers themselves preferably run an open-source operating system such as LINUX, have generally high performance CPUs, 1 gigabyte (GB) or more of memory, and 100 GB or more of disk storage. Of course, other types of computers can be used, and it is expected that as more powerful computers are developed in the future, they can be configured in accordance with the teachings herein. The functionality implemented by any of the elements can be provided from computer program products that are stored in tangible computer accessible storage mediums (e.g., RAM, hard disk, or optical/magnetic media).

A client 180 executes a browser 185 and can connect to the front end interface 110 via a network 170, which is typically the internet, but can also be any network, including but not limited to any combination of a local area network (LAN), a metropolitan area network (MAN), a wide area network (WAN), a mobile, wired or wireless network, a private network, or a virtual private network. While only a single client 180 and browser 185 are shown, it is understood that very large numbers (e.g., millions) of clients are supported and can be in communication with the web content hosting server 100 at any time or website 190. The client 180 may include a variety of different computing devices. Examples of client devices 180 are personal computers, digital assistants, personal digital assistants, cellular phones, mobile phones, smart phones or laptop computers. As will be obvious to one of ordinary skill in the art, the disclosed configuration is not limited to the devices listed above.

A browser 185 can include any application that allows users of client 180 to access web pages on the World Wide Web. Suitable applications are MICROSOFT INTERNET EXPLORER, NETSCAPE NAVIGATOR, MOZILLA FIREFOX, APPLE SAFARI or any application adapted to allow access to web pages on the World Wide Web. A user can access web pages on the web content hosting server 100 or on website 190. Though only one website is shown, it is understood that very large numbers (e.g., millions) of websites are supported and can be in communication with the client 180 or web content hosting server 100. For purposes of convenience and description of one embodiment, the users of client 180 and browser 185 will be referred to as a "user" or "users." In the context of the present discussion, a user will be accessing the web content hosting server 100 to view web content related to a geographic location specified by the user.

Figure 5:
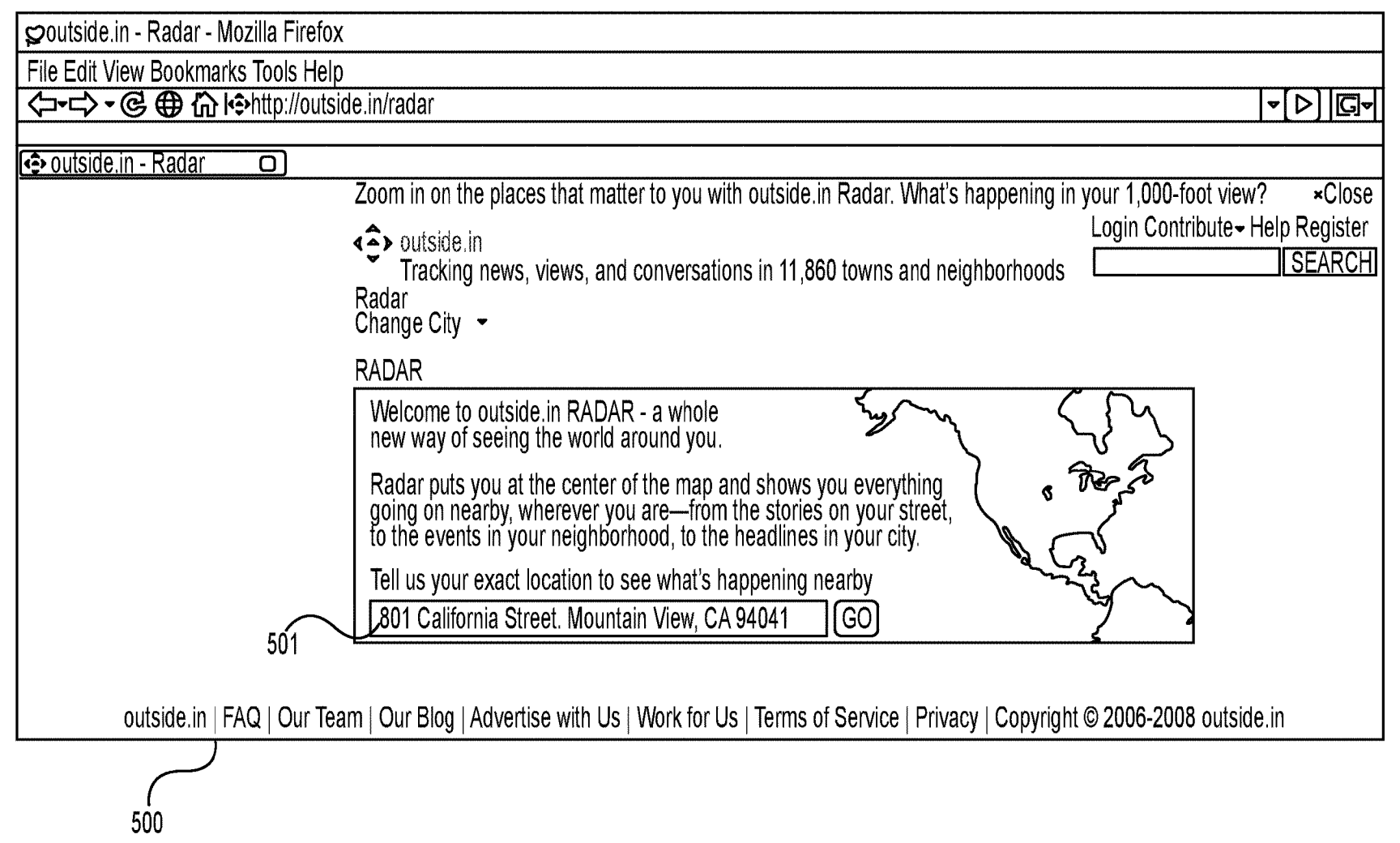
Figure 8:
FIG. 8 illustrates one embodiment of a web page providing a user web content that is relevant to a specified geographic location.

In one embodiment, the front end interface 110 provides communication between the various modules within the web content hosting server 100 and the browser 185. The front end interface receives geographic locations from the user and the locations are provided to the appropriate modules within the web content hosting server 100. An implementation of the front end interface 110 also provides a user interface, such as a website, to a user for specifying a geographic location, as shown in FIG. 5, and for viewing web content related to a geographic location specified by the user, as shown in FIG. 8 for example. FIGS. 5 and 8 will later be further described in further detail.

The geographic information database 160 stores geographic information of various geographic locations. In one embodiment, a geographic location is an address, zip code, neighborhood or city. The geographic information stored in the geographic information database 160 comprises latitude and longitude coordinates associated with various geographic locations. As an example, the geographic information database 160 may store the latitude and longitude coordinates corresponding to the address of "801 California Street, Mountain View, Calif." In one embodiment, the latitude and longitude corresponding to a geographic location may represent the centroid or centerpoint of a geographic area that contains the specified geographic location depending on the type of geographic boundary parameter used to determine a geographic boundary that surrounds the latitude and longitude coordinates. Note that the centroid is the center point of a regularly shaped boundary (e.g., circular boundary, rectangular boundary, or triangular boundary) or of a trapezoidal or other irregularly shaped boundary. In another embodiment, the geographic information database 160 stores region hierarchies that indicate geographic locations related to a specific geographic location. For example, the geographic information database 160 may store information indicating that the neighborhood of Park Slop is associated with Brooklyn which is associated with New York City.

In an embodiment, the geographic information comprises a geographic boundary associated with a geographic location. A geographic boundary may define an area that bounds a particular neighborhood or a city, for example. In an embodiment, the neighborhoods and/or cities stored in the geographic information database 160 are defined by a boundary-box system provided by a mapping company, such as Maponics, Inc., that defines the neighborhoods and/or cities within a geographic area.

A web content database 150 stores geocoded targeted web content. As previously mentioned, geocoded targeted web content is web content, such as news articles, sports information, music reviews, movie reviews, restaurant reviews, real estate information, gossip or any other web content that can be associated with a particular geographic location based on the substance comprised in the web content. In one embodiment, the geocoded targeted web content is stored in web content tables where each web content table is associated with a general geographic area, such as a city. Each piece of web content within a web content table comprises location tags that associate the web content with a specific geographic location within the general geographic area that describes the table. In one embodiment, a type of location tag is an address tag that describes an address associated with a piece of web content. The address tag may indicate an address mentioned within the web content or an address that is associated in some manner with the web content. Another type of location tag is a neighborhood tag or a city tag which indicates the neighborhood or city associated with the web content.

Referring now to FIG. 2, there is shown an example of a web content table 200 that corresponds to the city of Mountain View, Calif. Illustrated in the web content table 200 are various web content 201, 203, and 205 that are geocoded to correspond to the city of Mountain View. In this example, a news article 201, a motorcycle dealer review 203 and a restaurant guide 205 are geocoded as to correspond to the general geographic area of the city of Mountain View, Calif. As previously mentioned, each piece of web content has associated location tags that associate the web content with a specific geographic location within the general geographic location that describes the web content table.

In this example, each piece of web content is tagged with an address tag 207 that describes an address associated with the web content. For example, the motorcycle dealer review 203 titled "A Look At Ducati Honda Peninsula" is tagged with the address of "1289 W. El Camino Real, Mountain View, Calif." that may represent the address of the dealership located within the review. Additionally, each piece of web content has a neighborhood tag 209 that describes the neighborhood associated with the web content. For example, the neighborhood tag associated with the news article 201 "Traffic in Mountain View" has a neighborhood tag of "Downtown Mountain View" as the news article 201 may comprise substance regarding the traffic conditions in the neighborhood of downtown Mountain View. In one embodiment, each web content also has a city tag 211. The city tag describes the city related to the web content. Using the news article 201 example, the news article has a city tag of "Mountain View" since the news article illustrates the traffic conditions in the city of Mountain View.

Referring now back to FIG. 1, the analysis module 120 determines the various location tags described above that are associated with the web content which will be stored in the web content database 150. In one embodiment, web content that will be stored in the web content database 150 is purchased from a company that is independent from the web content hosting server 100. In another embodiment, web content may be located on the Internet using a web crawler. The analysis module 120 analyzes each piece of web content for geographic location information prior to the storage of the web content in the web content database 150.

In one embodiment, the analysis module 120 determines the location tags from the content or substance displayed in the web page. The analysis module 120 analyzes the substance (e.g., text or metadata) of the web content for any keywords, capitalized words, or phrases indicative of a geographic location stored in the geographic information database 160. The analysis module 120 compares the keywords or phrases to geographic locations in the geographic information database 160 to determine whether the information located in the web content is a geographic location. In another embodiment, the analysis module 120 determines location tags based on the source of the web content. Once a geographic location has been determined, the analysis module 120 generates the appropriate location tags for the piece of web content before storing the web content in the web content database 150.

Figure 3:
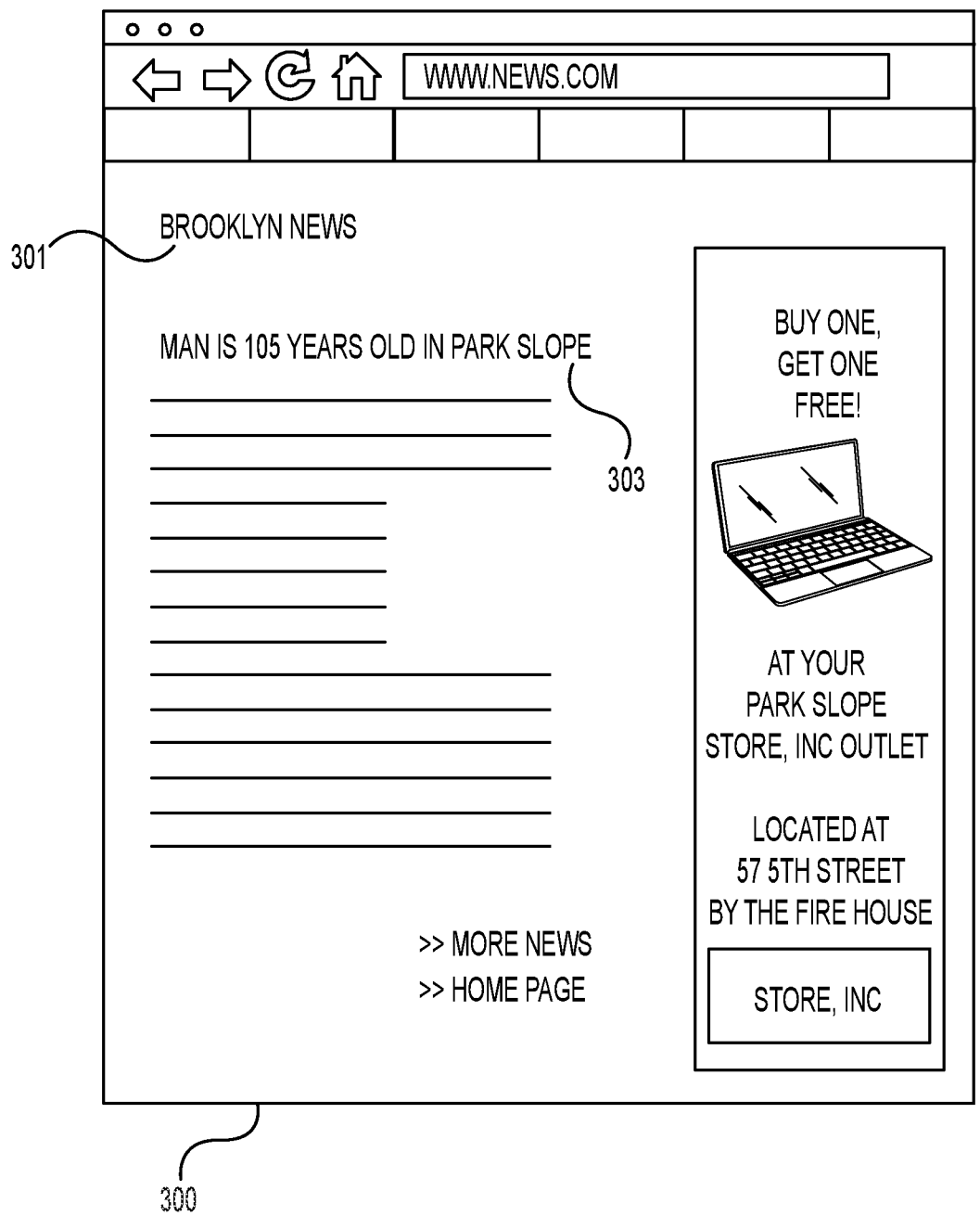
FIG. 3 illustrates one embodiment of web content comprising a news article.

Referring now to FIG. 3, there is shown an example of web content containing a news article 300 that is analyzed by the analysis module 120 for geographic location information. The analysis module 120 analyzes the substance of the news article 300 for locations such as an address, city, or neighborhood that corresponds to geographic location information stored in the geographic information database 160. In this example, the analysis module 120 determines that the keyword "Park Slope" from the title 303 of the news article "Man is 105 years old in Park Slope" corresponds to a neighborhood stored in the geographic information database 160. Additionally, the analysis module 120 determines that the keyword "Brooklyn" from the source 301 of the news article "Brooklyn News" corresponds to a city in the geographic information database 160. The analysis module 120 associates the news article 300 with a neighborhood tag of "Park Slope" and a city tag of "Brooklyn" prior to storing the article in the web content database 150. In another embodiment, the analysis module 120 refers to the region hierarchies stored in the geographic information database 160 to determine the value of the city tag associated with the determined neighborhood.

Refer now back to FIG. 1. Once a user has accessed the web content hosting server 100 via the user interface provided by the front end interface 110, the determination module 130 receives a geographic location specified by the user from the front end interface 110. In one embodiment, the geographic location may comprise an address, zip code, neighborhood, city or any other geographic specific location that is of interest to the user. The received location represents a specific location in which the user is interested in knowing events, articles, news stories, for example, that are occurring near the specified location. The determination module 130 determines latitude and longitude coordinates associated with the geographic location specified by the user by referring to the geographic information database 160. The determination module 130 searches the geographic information database 160 for the latitude and longitude coordinates associated with the specified geographic location. The latitude and longitude coordinates represent the location in which the search for web content will be focused.

In one embodiment, the determination module 130 determines a geographic boundary that comprises the geographic location specified by the user. In one embodiment, the determination module 130 determines a geographic boundary such that the latitude and longitude coordinates associated with the location are at the centerpoint of the boundary which is a specific distance away from the centerpoint. In another embodiment, the determination module 130 may determine the neighborhood boundary or city boundary that encompasses the latitude and longitude coordinates by referring to the geographic information database 160. The determination module 130 searches the geographic information database 160 for the neighborhood boundary and/or city boundary in which the specified geographic location is located. Geographic boundaries will be described in further detail below.

A web content search module 140 searches the web content database 150 for web content that is associated with a geographic location specified by the user. The web content search module 140 analyzes the location tags of the web content for tags indicating that a particular web content contains substance relevant to an area within the geographic boundary surrounding the specified geographic location. Once the web content search module 140 has located the appropriate web content, the web content search module 140 provides the web content to the front end interface 110 for presentation to the user.

Providing Geocoded Targeted Web Content Process

In one embodiment, the process of providing geocoded targeted web content of the web content hosting server 100 determines web content associated with a user specified geographic location so that the user is aware of web content that pertains to the specified location. The process allows a user to track web content related to the specified geographic location of interest so that the user is aware of any events, stories or headlines, for example, which are occurring near the specified location. The process performed by the web content hosting server 100 to provide geocoded targeted web content is further described below. Note that other embodiments perform the illustrated steps in different orders, and/or perform different or additional steps.

Figure 4:
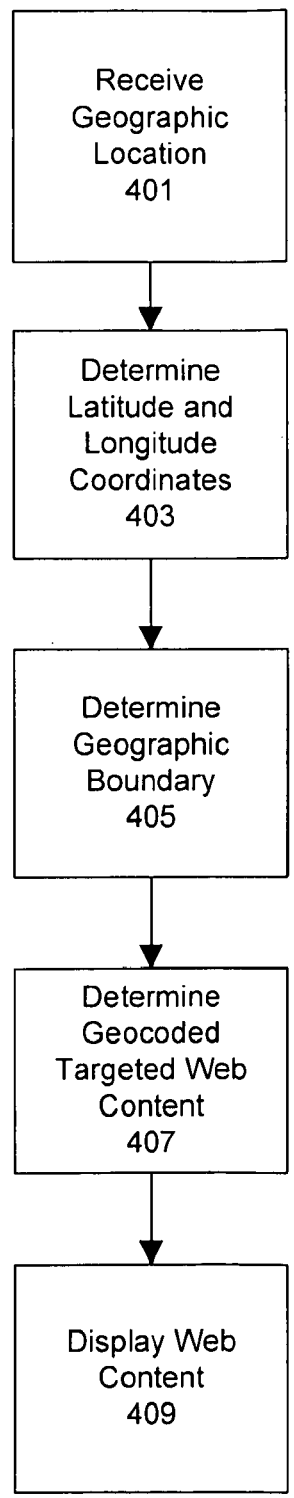
FIG. 4 illustrates one embodiment of a flow diagram describing a method to provide geographic location specific web content.

Referring now to FIG. 4, the web content hosting server 100 performs the functional steps to provide geocoded targeted web content: 401: Receive geographic location; 403: Determine latitude and longitude coordinates; 405: Determine geographic boundary; 407: Determine geocoded targeted web content; and 409: Display web content. Each of these steps will now be described in further detail.

At step 401, the determination module 130 receives a geographic location that has been specified by the user. Referring now to FIG. 5, there is shown one embodiment of a web page 500 for receiving a user specified geographic location. In one embodiment, the user submits a geographic location in the text box 501 in order for the web content hosting server 100 to provide the user with web content that illustrates what is occurring around the specified geographic location. In one embodiment, the geographic location is a specific address, street, neighborhood or city of interest to the user. The specified geographic location corresponds to any location associated with a user such as the user's home, work place, current location or any location of interest to the user. The user may also specify a geographic location that corresponds to any location of a person that is associated with the user, such as a friend or relative, in order for the user to keep track of what is occurring around the other person's location. In the example illustrated in FIG. 5, the user has entered the geographic location of "801 California Street, Mountain View, Calif. 94041" in order to be displayed web content that is associated with the specified location. Once the geographic location has been submitted by the user, the determination module 130 receives the geographic location.

Referring back to FIG. 4, at step 403 the determination module 130 determines latitude and longitude coordinates associated with the received geographic location. In one embodiment, the determination module 130 refers to the geographic information database 160 to determine the latitude and longitude coordinates that correspond to the user specified geographic location. In one embodiment, the latitude and longitude coordinates are considered the centroid or centerpoint of a geographic area in which the search for web content will be focused. Generally, the latitude and longitude coordinates of a geographic location are used by the web content hosting server 100 to determine web content associated with the specified geographic location and the geographic area surrounding the location.

Referring to FIG. 4, at step 405 the determination module 130 determines a geographic boundary associated with the specified geographic location. The geographic boundary defines a geographic area in which a search for web content will be focused. In one embodiment, the determination module 130 receives a geographic boundary parameter from the user in order to determine the geographic boundary. In one embodiment, the geographic boundary parameter represents a boundary that surrounds the specified geographic location. In one embodiment, the geographic boundary parameter may restrict the boundary to the neighborhood or city where the specified geographic location is located. The determination module 130 refers to the geographic information database 160 for neighborhood or city boundary information associated with the specified geographic location.

Figure 6:
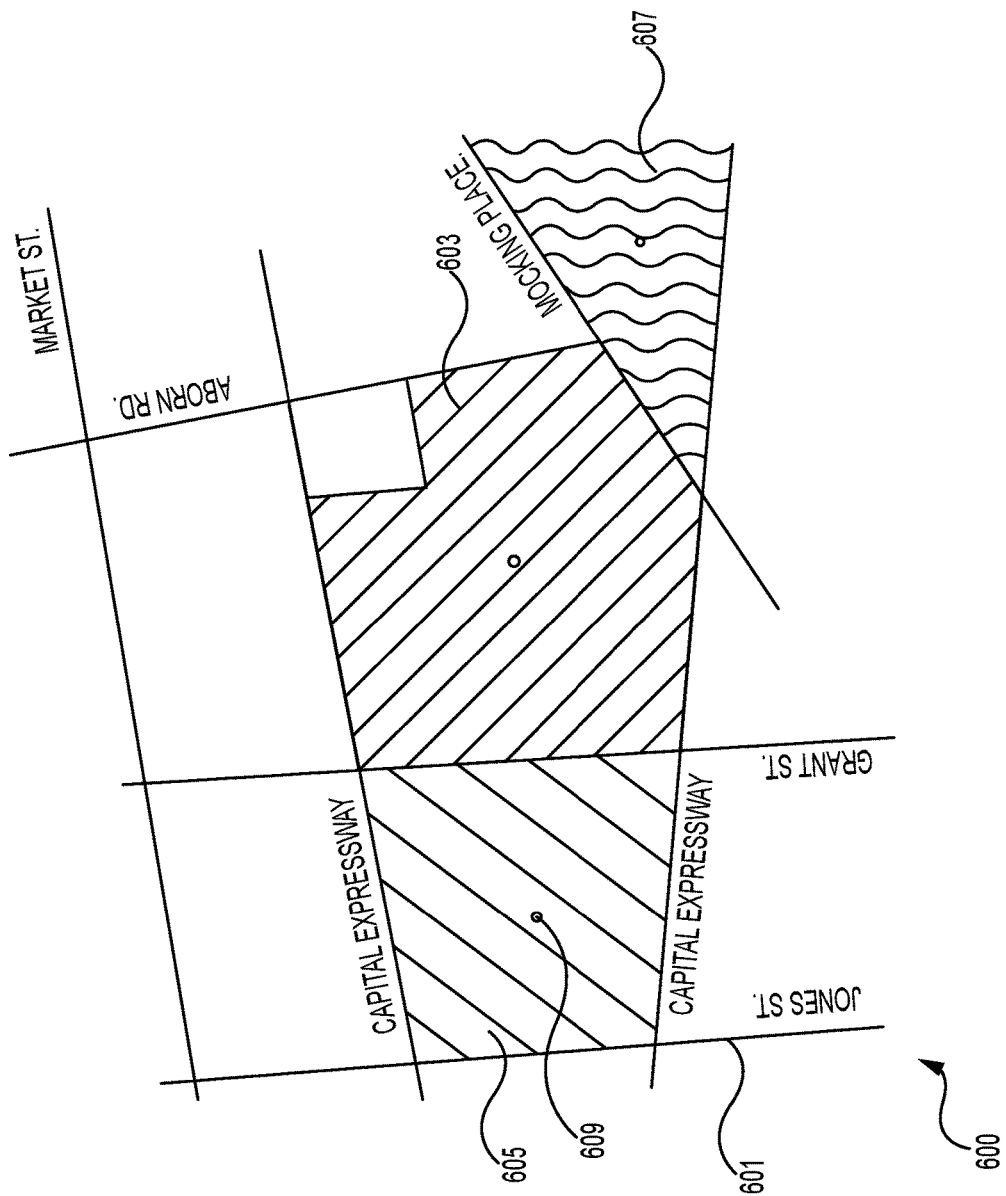
FIG. 6 illustrates one embodiment of a diagram indicating various neighborhoods depicted by trapezoidal regions.

Referring now to FIG. 6, there is shown a diagram 600 illustrating various neighborhoods depicted by trapezoidal regions that include user specified geographic locations located within the neighborhoods. As previously mentioned, the neighborhoods may be defined by a boundary-box system provided by a mapping company, such as Maponics, Inc., that defines the neighborhood in which the specified geographic location is located. FIG. 6 illustrates neighborhood A 603, neighborhood B 605 and neighborhood C 607. The boundaries of each neighborhood are defined by various streets 601. The specified geographic location corresponds to the latitude and longitude coordinates 609. In this example, only web content within the area bounded by the neighborhood 605 is retrieved.

Note that the methods for determining the boundary of a neighborhood may also be used to determine the boundary of a city where a specified geographic location is located. In one embodiment, the neighborhoods within a city are arranged in a pre-set hierarchy as determined by a system administrator of the web content hosting server 100. The determination module 130 determines the neighborhood in which the specified location is located such that that particular neighborhood is associated with the first position in the pre-set hierarchy so that the web content related to that particular neighborhood is considered more relevant to the geographic location compared to the web content associated with the other neighborhoods within the city.

In another embodiment, the geographic boundary parameter is a boundary distance from the geographic location that is specified by the user. The boundary distance represents the distance from the geographic location to the outer bounds of a geographic boundary. The determination module 130 may receive a boundary distance indicating a distance of 1000 feet, for example, via a text input specifying the distance or via a distance slider on a map illustrating the geographic location that allows the user to adjust the boundary distance as the user is viewing the related web content. The determination module 130 determines a circular geographic area that bounds the specified geographic location based on the geographic location and the boundary distance. When a boundary distance is used, the latitude and longitude coordinates corresponding to the specified geographic location are considered the centroid or centerpoint of the bounded circular geographic area.

Figure 7:
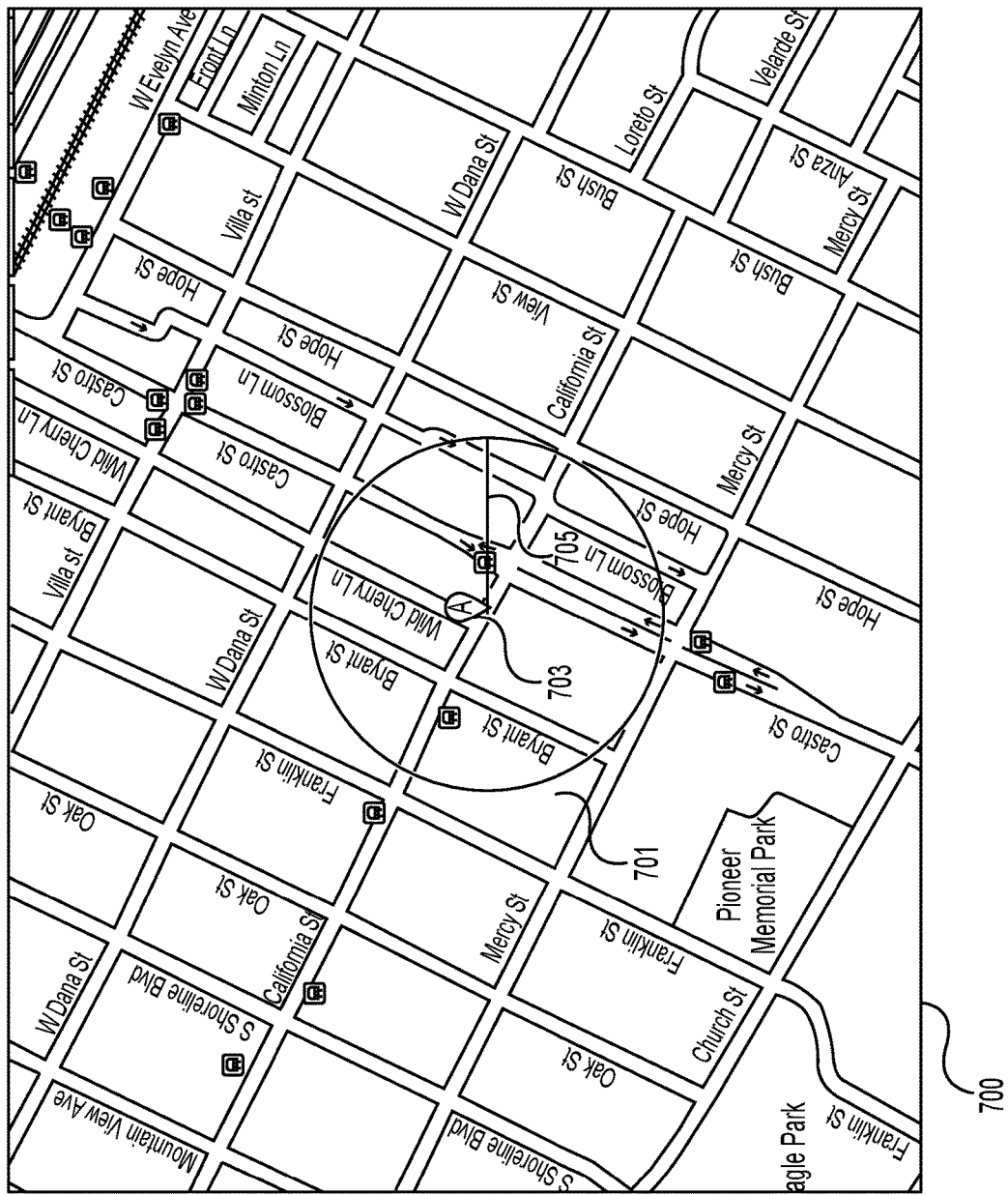
FIG. 7 illustrates one embodiment of a boundary surrounding a centroid.

Referring now to FIG. 7, there is shown a map 700 of an area illustrating centroid 703 that is bounded by a circular boundary 701. Responsive to a boundary distance being specified, the determination module 130 associates the latitude and longitude coordinates of the geographic location specified by the user as the centroid of an area. The determination module 130 determines the circular boundary 701 from the boundary distance 705 and the location of the centroid 703. For example, the boundary distance may be set to a distance of 1000 feet which results in a circular boundary 701 with a radius of 1000 feet from the centroid 703.

In one embodiment, rather than the user specifying the geographic boundary parameter, the determination module 130 automatically determines one or more geographic boundaries based on a combination of a distance boundary, a neighborhood boundary and/or a city boundary. By determining more than one boundary that surrounds the geographic location, the determination module 130 generates concentric boundaries with the latitude and longitude coordinates of the geographic location at the center. For example, the determination module 130 may determine a circular geographic area that bounds the latitude and longitude coordinates which are located at the center of the circular area based on a defined boundary distance as set by a system administrator of the web content hosting website 100. In one embodiment, the geographic boundary of the neighborhood or neighborhoods that encompasses the circular area is determined by the determination module 130. In a further embodiment, the geographic boundary of the city in which the neighborhood(s) and circular area are located is determined by the determination module 130. By determining concentric boundaries, the web content hosting website 100 can retrieve web content located within each of the various geographic boundaries described above so that the user is aware of web content that varies in degrees of relevance to the specified geographic location. It is noted that the boundaries can have a variety of shapes, for example, circles, squares, rectangles, polygons or trapezoids.

Referring back to FIG. 4, in step 407, the web content search module 140 determines geocoded web content that is to be displayed to the user based at least in part on the geographic boundary or geographic boundaries described above. As previously mentioned, the web content stored in the web content database 150 are in tables that correspond to a general geographic location, such as a city. Each piece of web content is tagged with location tags that describe specific geographic locations, such as an address, neighborhood or city, associated with the web content. Generally, the web content search module 140 determines a web content table associated with the city that bounds the specified geographic location regardless of whether a geographic boundary parameter indicates a city boundary. This is done in order to locate the appropriate web content table that will be searched for web content pertaining to the specified geographic location. Once the appropriate web content table is located, the web content search module 140 analyzes the location tags in the web content table to determine location tags that indicate an address, neighborhood or city within the boundary that surrounds the latitude and longitude coordinates of the specified geographic location.

For example, assume that a user specified a geographic location of "801 California Street, Mountain View, Calif. 94041" and that the determination module 130 automatically determined concentric boundaries comprising a circular geographic boundary with a boundary distance of 1000 feet from the latitude and longitude coordinates and a neighborhood boundary that surrounds the circular geographic boundary. The web content search module 140 determines that the web content table associated with the city of Mountain View, Calif. will be searched for web content. The web content search module 140 analyzes the address tags of the web content in the table to determine the web content with address tags that indicate an address within the 1000 feet radius from the user specified location. The web content search module 140 also searches the web content table for any web content with a neighborhood tag of "Old Mountain View" since the geographic location specified by the user is located in the neighborhood of "Old Mountain View."

Referring back to FIG. 4, the final step 409 the front end interface 110 displays the web content determined by the web content search module 140 to the user. The front end interface 110 provides the web content to the user in a user interface, such as a website, so that the user is aware of information around the specified geographic location. In another embodiment, rather than displaying the web content in the user interface, the web content may be e-mailed, twittered or sent via rich site summary (RSS) to the user so that the user need not visit the web content hosting server 100 to be updated with the information related to the specified geographic location.

Referring now to FIG. 8, there is shown one embodiment of a user interface 800 that displays the web content related to the user specified geographic location of "801 California Street, Mountain View, Calif. 94041." In one embodiment, the web content 809 is hierarchically ordered based on distance from the geographic location specified by the user. In one embodiment, the hierarchy is ordered in descending order starting with web content within 1000 ft of the specified location, web content in and around the neighborhood associated with the specified location, web content in and around the borough (if applicable) associated with the specified location and web content in and around the city associated with the specified location. As shown in the user interface 800, the web content 809 is divided into sections. The web content in section 801 illustrates web content that was determined to be associated with the geographic area within 1000 feet of the latitude and longitude coordinates corresponding to 801 California Street, Mountain View, Calif. 94041. In section 803, the web content that are located within the geographic area of a neighborhood or city boundary and outside of circular geographic boundary (i.e., 1000 feet from the latitude and longitude coordinates) is displayed. Note that if web content associated with a specific section (i.e., articles within 1000 ft or in and around the neighborhood) are not located, the section is not displayed to the user.

In one embodiment, the web content is ordered based on a pre-set hierarchy according to the neighborhoods within the city. The neighborhood that comprises the specified geographic location is associated with the first position in the hierarchy followed by the other neighborhoods that exist within the city. The web content within the neighborhood where the geographic location is located is displayed at the top of the displayed list of web content with the web content in the other neighborhoods or web content associated with an area within the city that comprises the specified geographic location is displayed in descending order based on distance to the geographic location relative to the neighborhood's position in the hierarchy.

In one embodiment, the front end interface 110 displays the web content determined by the web content search module 140 in a hierarchal list in the user interface rather than being web content being divided into sections. In one embodiment, the web content is displayed in the hierarchal list in descending order based on distance from the geographic location. For example, the web content nearest in distance to the specified geographic location is displayed at the top of the hierarchal list followed by the web content that is the next closest in distance to the geographic location.

Additionally, the user interface 800 provides topic filters 807 to the user. The user may select to filter out web content that does not correspond to the specified topic by the user. For example, the user may specify that the user is only interested in web content relating to art, bars & clubs and sports. Thus, only web content that is relevant to these topics is displayed to the user using the methods described above. In an embodiment, the user interface 800 provides a text box 805 so that the user can change the geographic location in which the search for web content is focused. In a further embodiment, the user interface 800 provides a mechanism, such as a boundary slider, (not shown) to change the boundary distance (e.g., from 1000 feet to 500 feet) such that the web content displayed to the user can be dynamically updated according to the boundary distance specified by the user.

Figure 9:
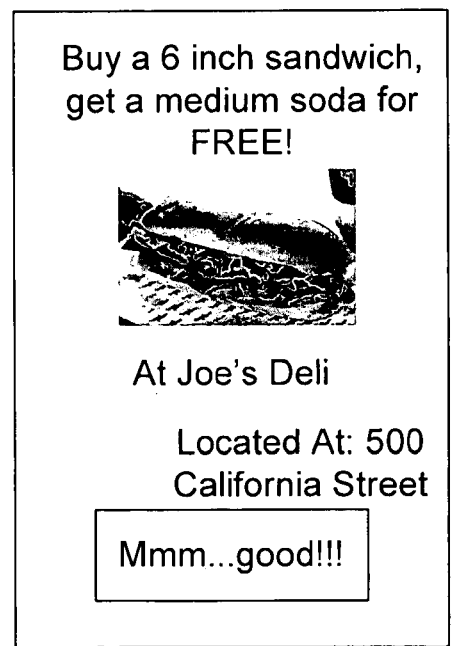
FIG. 9 illustrates one embodiment of a geocoded targeted web advertisement.

In one embodiment, the web content hosting server 100 is configured to perform the processes of generating geocoded targeted web advertisements using the methods and system described in U.S. patent application Ser. No. 12/144,538, entitled "Generating Geocoded Targeted Web Advertisements," by inventors Robert F. Deeming and Steven B. Johnson, and assigned to the same assignee as the present application, the contents of which are herein incorporated by reference. In one embodiment, the web content hosting server 100 may generate and provide geocoded targeted web advertisements to the user based at least in part on the geographic location specified by the user. Referring to FIG. 9, there is shown an example of a geocoded targeted web advertisement 900 for a lunch special at "Joe's Deli." The web advertisement 900 may be displayed to the user every day at a specific time in the user interface 800 reflecting the daily lunch specials at "Joe's Deli" which is located near the geographic location specified by the user. Web advertisers can utilize the web content hosting server 100 to provide geocoded targeted web advertisements to the user that are relevant to location specified by the user in order to promote sales or specials.

The features described herein beneficially provide a system and method to provide geocoded targeted web content to a user. A user no longer has to spend extraneous effort to locate web content that is relevant to a specified location, such as an address. Using the system and method disclosed above, the user is provided web content that is relevant to a specific address, street or neighborhood, for example, by determining a geographic boundary that comprises the geographic location specified by the user and retrieving web content with information associated with a location within the geographic boundary. Thus, the system and method allows the user to keep track of what is happening in the area near their home, work or current location without the need for the user to filter through web content that is not directly related to the user's specified location.

Some portions of above description describe the embodiments in terms of algorithms and symbolic representations of operations on information, for example, the processes described and illustrated through FIGS. 1 through 4 and explained through the examples in FIGS. 2, 3 and 5-9. These algorithmic descriptions and representations are commonly used by those skilled in the data processing arts to convey the substance of their work effectively to others skilled in the art. These operations, while described functionally, computationally, or logically, are understood to be implemented by computer programs (e.g., as instructions) or equivalent electrical circuits, microcode, or the like and are executed by a processor or other like device. Furthermore, it has also proven convenient at times, to refer to these arrangements of operations as modules, for example as in FIG. 1, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for providing geocoded targeted web content based on a specified geographic location through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of providing geocoded web content for display on user devices, the method comprising operations performed by at least one processor, the operations comprising:

receiving, by a server processor via a communications network, location coordinates from a user device associated with a user, the location coordinates indicating a geographic location of the user device;

determining a first geographic boundary surrounding the location coordinates, the first geographic boundary being a first distance from the geographic location of the user device;

determining a second geographic boundary surrounding the first geographic boundary;

receiving an indication from the user device that the second geographic boundary is adjusted to a third geographic boundary;

determining one or more geocoded web content items corresponding to one or more of the first geographic boundary, the second geographic boundary, and the third geographic boundary;

based on an analysis of the location coordinates, determining a hierarchical order of the one or more geocoded web content items; and transmitting the one or more geocoded web content items to the user device for display in the determined hierarchical order.

2. The computer-implemented method of claim 1, wherein the location coordinates represent a centroid of the first geographic boundary.

3. The computer-implemented method of claim 1, wherein determining the second geographic boundary is based at least in part on a boundary parameter received from the user device of the user.

4. The computer-implemented method of claim 3, wherein the boundary parameter indicates at least one of a neighborhood and a city surrounding the first geographic boundary.

5. The computer-implemented method of claim 3, wherein the boundary parameter indicates a city surrounding the first geographic boundary, and wherein the method further comprises:

determining one or more neighborhoods located within the city;

determining an order for the one or more neighborhoods, wherein each of the one or more neighborhoods is associated with a position in the order;

determining a neighborhood from the one or more neighborhoods that comprises the location coordinates; and associating the determined neighborhood with a first position in the order.

6. The computer-implemented method of claim 1, wherein the first geographic boundary is a specified distance from the geographic location.

7. The computer-implemented method of claim 1, wherein the geographic location inside the first geographic boundary corresponds to one of a center of a regularly shaped geographic boundary, a trapezoidal boundary, and an irregularly shaped boundary.

8. The computer-implemented method of claim 1, further comprising:

transmitting a web advertisement that is associated with the geographic location.

9. The computer-implemented method of claim 1, further comprising:

transmitting, by the server processor, updated geocoded web content items to the user device based on adjusting the second geographic boundary to the third geographic boundary, the updated geocoded web content including information associated with a location within the third geographic boundary.

10. A computerized system for providing geocoded content, the system comprising:

a storage medium that stores a set of instructions; and at least one processor that executes the set of instructions to cause the at least one processor to:

receive, by a server processor via a communications network, location coordinates from a user device associated with a user, the location coordinates indicating a geographic location of the user device;

determine a first geographic boundary surrounding the location coordinates, the first geographic boundary being a first distance from the geographic location of the user device;

determine a second geographic boundary surrounding the first geographic boundary;

receive an indication from the user device that the second geographic boundary is adjusted to a third geographic boundary;

determine one or more geocoded web content items corresponding to one or more of the first geographic boundary, the second geographic boundary, and the third geographic boundary:

based on an analysis of the location coordinates, determine a hierarchical order of the one or more geocoded web content items; and transmit the one or more geocoded web content items to the user device for display in the determined hierarchical order.

11. The computerized system of claim 10, wherein the location coordinates represent a centroid of the first geographic boundary.

12. The computerized system of claim 10, wherein determining the second geographic boundary is based at least in part on a boundary parameter received from the user device of the user.

13. The computerized system of claim 12, wherein the boundary parameter indicates at least one of a neighborhood and a city surrounding the first geographic boundary.

14. The computerized system of claim 12, wherein the boundary parameter indicates a city surrounding the first geographic boundary, and wherein the method further comprises:

determining one or more neighborhoods located within the city;

determining au order for the one or more neighborhoods, wherein each of the one or more neighborhoods is associated with a position in the order;

determining a neighborhood from the one or more neighborhoods that comprises the location coordinates; and associating the determined neighborhood with a first position in the order.

15. The computerized system of claim 10, wherein the geographic location inside the first geographic boundary corresponds to one of a center of a regularly shaped geographic boundary, a trapezoidal boundary, and an nregularly shaped boundary.

16. The computerized system of claim 10, further comprising:

transmitting a web advertisement that is associated with the geographic location.

17. The computerized system of claim 10, further comprising:

transmitting, by the server processor, updated geocoded web content items to the user device based on adjusting the second geographic boundary to the third geographic boundary, the updated geocoded web content including information associated with a location within the third geographic boundary.

18. A tangible non-transitory computer-readable storage medium that stores a set of instructions, the set of instructions being executable by at least one processing system to cause the processing system to:

receive, by a server processor via a communications network; location coordinates from :a user device associated with a user, the location coordinates indicating a geographic location of the user device;

determine a first geographic boundary surrounding the location coordinates, the first geographic boundary being a first distance from the geographic location of the user device;

determine a second geographic boundary surrounding the first geographic boundary;

receive an indication from the user device that the second geographic boundary is adjusted to a third geographic boundary;

determine one or more geocoded web content items corresponding to one or more of the first geographic boundary, the second geographic boundary, and the third geographic boundary;

based on an analysis of the location coordinates, determine a hierarchical order of the one or more geocoded web content items; and transmit the one or more geocoded web content items to the user device for display in the determined hierarchical order.

19. The tangible non-transitory computer-readable storage medium of claim 18, wherein the location coordinates represent a centroid of the first geographic boundary.

20. The tangible non-transitory computer-readable storage medium of claim 18, wherein determining the second geographic boundary is based at least in part on a boundary parameter received from the user device of the user.

* * * * *